United States Patent [19]
Morita et al.

[11] Patent Number: 5,984,445
[45] Date of Patent: Nov. 16, 1999

[54] BACK PRINTING APPARATUS FOR USE WITH LIGHT-SENSITIVE MATERIALS

[75] Inventors: Naoyuki Morita, Kanagawa; Tomoya Norinobu, Saitama, both of Japan

[73] Assignees: Fuji Photo Film Co., Ltd., Kanagawa; Fuji Photo Optical Co., Ltd., Saitama, both of Japan

[21] Appl. No.: 08/937,803

[22] Filed: Sep. 25, 1997

[30] Foreign Application Priority Data

Sep. 26, 1996 [JP] Japan ................................. 8-254536

[51] Int. Cl.⁶ .................................................. G03B 27/32
[52] U.S. Cl. ................................ 347/2; 347/88; 355/39; 355/40; 396/564
[58] Field of Search ........................... 347/2, 88; 355/27, 355/28, 39, 40, 41; 358/302; 396/564, 578

[56] References Cited

U.S. PATENT DOCUMENTS

| | | |
|---|---|---|
| 4,823,163 | 4/1989 | Rollet et al. . |
| 5,585,879 | 12/1996 | Tahara et al. ........................... 396/570 |
| 5,821,963 | 10/1998 | Sutera et al. .............................. 347/68 |

*Primary Examiner*—Joan Pendegrass

[57] ABSTRACT

The improved back printing apparatus for recording a back print on a non-exposed surface of a light-sensitive material to be subjected to wet photographic processing comprises a charging section to be charged with an ink which is heat-fusible but solid at ordinary temperatures and which is not water-soluble; a melting section for melting the ink; and a print head from which the ink melted in the melting section is jetted to record the back print. Using this back printer, one can produce sharp back prints of high quality without causing any adverse effects on the light-sensitive material A and yet good handling properties are assured.

9 Claims, 3 Drawing Sheets

BACK PRINTING APPARATUS FOR USE WITH LIGHT-SENSITIVE MATERIALS

BACKGROUND OF THE INVENTION

This invention relates to the art of back printing apparatus which are typically used in photographic printers to record back prints on the back side of light-sensitive materials.

The image recorded on photographic films such as negatives and reversals is exposed for printing on light-sensitive materials (photographic papers) by means of photographic printers. Conventional photographic printers have a capability for recording a "back print" consisting of a set of characters such as letters, marks, symbols and figures on the back side (non-exposed surface) of an individual photograph (finished print). The back print comprises various kinds of information on the print, including frame number, film number, dates such as the date of shooting the photographic film and the date of printing the film image onto the light-sensitive material, photo finisher (lab) identification code and other data.

A recently announced new version of photographic standards called "advanced photo system" specifies that a back print should consist of at least two lines each consisting of at least 40 characters or letters. In addition, it is recommended to provide a capability for recording information other than the data listed in the preceding paragraph, such as titles indicating "travel", "graduation ceremony" and "birthday", in accordance with the magnetic information recorded on the film.

In the conventional photographic printers, such back prints are commonly provided by a dot impact printer using an ink ribbon cassette and a serial dot head or an ink jet printer using an ink jet head. However, both types of printers have their own problems as described below.

The dot impact printer records the necessary information on a light-sensitive material by striking (giving impact on) an ink ribbon in contact with the back side of the light-sensitive material by means of a head. Because of this operating theory, either sensitization or desensitization occurs in areas around the printed portion, thus causing a failure to accomplish recording in uniform density. In addition, the need to apply impact for recording causes a problem in that if the head is not adjusted properly, an excessive recording pressure will be applied to form high spots on the surface of the light-sensitive material (print). Another difficulty with the dot impact printer is that bleeding is most likely to occur in the recorded characters or letters and the like, with occasional deterioration in image quality.

The ink jet printer performs noncontact recording and, hence, is free from the problems resulting from the contact and impact recording which occur in the dot impact printer. On the other hand, the ink used with the ink jet printer is typically water-soluble, so the back print will dissolve out if the exposed light-sensitive material is subjected to wet photographic processing. A nonaqueous (not water-soluble) ink which is adapted for wet photographic processing is available but it presents a handling problem since it will easily plug the nozzles on the head.

SUMMARY OF THE INVENTION

The present invention has been accomplished under these circumstances and has as an object providing a novel back printing apparatus that is typically employed in a photographic printer to record back prints such as characters, letters, marks, other symbols and figures on the back side (nonexposed surface) of light-sensitive materials, that is capable of achieving noncontact recording without suffering from density unevenness, high spot formation on the print surface and other problems that are associated with contact recording as by dot impact printers, that can be subjected to wet photographic processing without causing the back print to dissolve out, and that yet is easy to handle.

The stated object of the invention can be attained by a back printing apparatus for recording a back print on a non-exposed surface of a light-sensitive material to be subjected to wet photographic processing comprising:

a charging section to be charged with an ink which is heat-fusible but solid at ordinary temperatures and which is not water-soluble;

a melting section for melting said ink; and a print head from which the ink melted in said melting section is jetted to record the back print.

The ink is preferably gray in color.

The ink is also preferably black in color.

In a preferred embodiment, the ink has a melting point higher than a maximal temperature which occurs during the wet photographic processing of the light-sensitive material.

In another preferred embodiment, the melting point of the ink is at least 10° C. higher than the maximal temperature.

In a further preferred embodiment, the ink is designed and prepared in such a way as to realize its surface tension, wet property and volume shrinkage factor that permit satisfactory recording in accordance with species of the light-sensitive material and a recording density.

In a still further preferred embodiment, the ink is prepared by mixing at least one of waxes, at least one of aliphatic acid derivatives and at least one of necessary additives.

In a still further preferred embodiment, the printer head is equipped with temperate control means for controlling the temperature of the melted ink.

The printer head has preferably 10 to 100 nozzles through which the melted ink is jetted.

DETAILED DESCRIPTION OF THE INVENTION

The back printing apparatus of the invention for use with light-sensitive materials will now be described in detail with reference to the preferred embodiment shown in the accompanying drawings.

Figure 1:
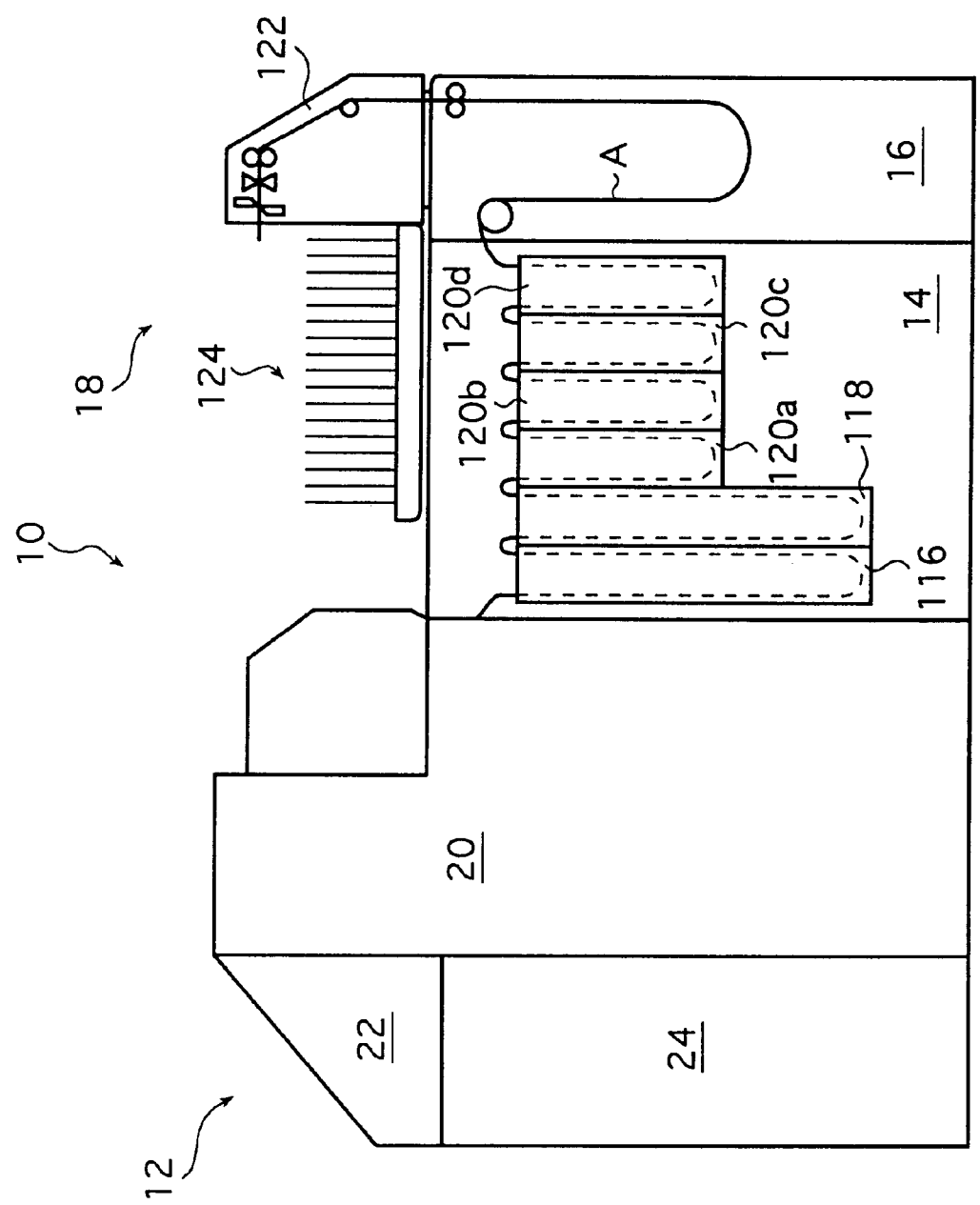
FIG. 1 shows the concept of a photographic printer/processor which utilizes the back printing apparatus of the invention.

FIG. 1 shows schematically a photographic printer/processor (generally referred to as a "photoprinter") which utilizes the apparatus of the invention (which is hereunder referred to as "a back printer") for the purpose of recording back prints.

The photographic printer/processor generally indicated by 10 in FIG. 1 is intended to be used in a "digital photoprinter" which operates by a process comprising the steps of reading the image on a film photoelectrically to provide digital signals, performing image processing on the digital signals to determine exposure conditions, thereby providing recording image information, and exposing a light-sensitive material by scanning with recording light modulated in accordance with said image information so as to record an image. Briefly, in accordance with the exposure conditions (printing conditions) which have been determined in an image processor on the basis of the reading with a scanner (image reader), the light-sensitive material A is exposed by scanning with the modulated light beams so as to print the image that has been recorded on the film.

The photographic printer/processor 10 may be considered as a "mini lab" which performs in a single unit all photofinishing operations including the exposure (printing) of the light-sensitive material A, photographic processing (wet development and drying), cutting the dried light-sensitive material into individual (finished) prints and sorting them. The basic components of the photographic printer/processor 10 are a printing unit 12 comprising a print/transport device 20, a light beam scanner 22 and an electrical section 24 containing a control board, a power supply and other necessary components, a developing unit 14, a drying unit 16 and an ejection unit 18, and these components are combined together into a single assembly.

Figure 2:
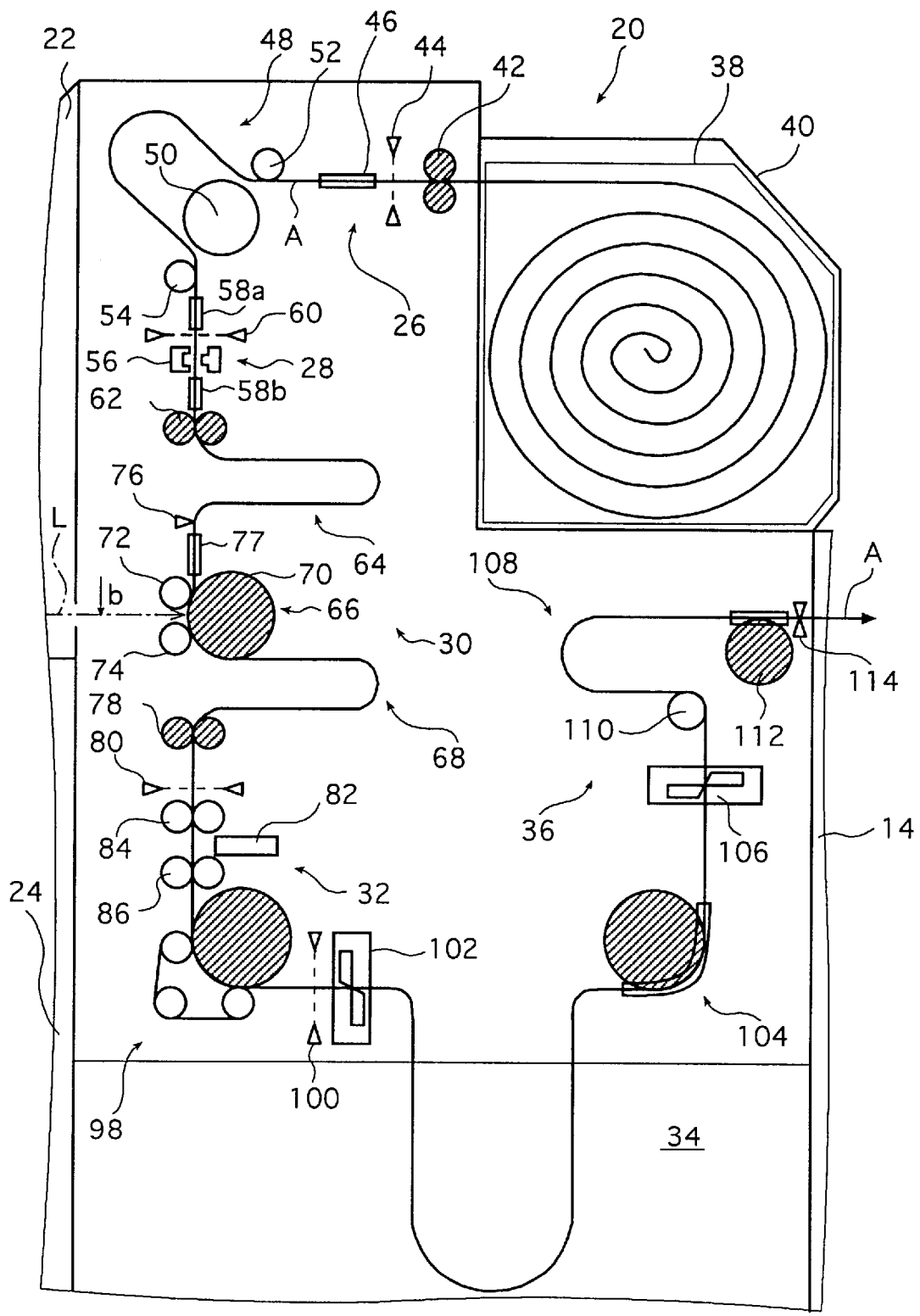
FIG. 2 shows the concept of a print/transport device section in the photographic printer/processor of FIG. 1.

FIG. 2 is an enlarged schematic view showing a part of the printing unit 12. The part shown in FIG. 2 is mostly the print/transport device 20.

In the print/transport device 20, the light-sensitive material A is unwound from a roll and transported in a predetermined path as various processes are performed such as the recording of image position information, imagewise exposure (printing) and back printing. As shown, the print/transport device 20 has a light-sensitive material supply section 26, a frame information constructing section 28, an exposing section 30, a back printing section 32 which utilizes the back printer 82 of the invention, a reservoir 34, a light-sensitive material ejecting section 36, and transport means for transporting the light-sensitive material A in a predetermined path that threads through these sections.

The light-sensitive material supply section 26 is an area that is loaded with a magazine 38 having a web of light-sensitive material A wound in a roll form that is contained in a light-shielding enclosure such that it can be drawn out of the magazine 38 to be supplied into the subsequent section. As shown, the light-sensitive material supply section 26 comprises an area 40 in which the magazine 38 is loaded, as well as a drawing roller pair 42, a sensor 44, a guide 46, etc. that are positioned downstream of the magazine loading area 40 in the direction of transport of the light-sensitive material A (the term "downstream" as it appears hereinafter shall be construed to have the meaning just described above).

The light-sensitive material A is drawn out of the magazine 38 by means of the drawing roller pair 42 and transported to a first loop forming section 48 downstream of the light-sensitive material supply section 26.

The sensor 44 detects the leading edge of the light-sensitive material A or checks for its presence or absence when the light-sensitive material A is rewound or re-loaded (threaded initially) as in magazine replacement.

The first loop forming section 48 is positioned downstream of the light-sensitive material supply section 26. It forms a loop (a surplus or slack portion) of the light-sensitive material A to thereby ensure that it will stop smoothly when a punch 56 in the downstream frame information constructing section 28 is activated. As shown, the first loop forming section 48 comprises a drive roller 50, guide rollers 52 and 54, etc. The drawing roller pair 42 draws the light-sensitive material A out of the magazine 38 in accordance with its amount (length) present in the first loop forming section 48.

The frame information constructing section 28 is provided downstream of the first loop forming section 48. In ordinary photographic printing and development processes including the one performed with the illustrated photographic printer/processor 10, the light-sensitive material A is not cut during the process but remains in a web form as it is subjected to continuous imagewise exposing and developing processes and the processed web is eventually cut into individual finished prints P in the ejecting unit 18. Therefore, in order to determine or detect the image recording position on the light-sensitive material A, the position of its cutting, the back printing position and the like, "frame information" which is position information representing the boundary between adjacent prints (frames) has to be constructed. In addition, "sort information" which represents the position for a unit number of prints corresponding to one film has to be constructed for the purpose of sorting in the ejecting unit 18. Tile frame information constructing section 28 is a site for constructing the above-defined frame information and/or sort information by making holes at the advancing end of the light-sensitive material A in a position that corresponds to a single frame or the unit number of prints to be sorted.

The photographic printer/processor 10 shown in FIG. 1 which employs the back printer 82 of the invention is designed to cut the dried light-sensitive material A into individual prints at the last stage of processing. The back printer 82 of the invention is equally applicable with advantage to other types of photographic printer/processor, such as one which cuts a web of light-sensitive material into specified lengths (commonly called "cut sheets") before exposure is performed, and one which is initially loaded with cut sheets of a specified length that are taken out individually for exposure. In these models which perform exposure on cut sheets, the provision of the frame information constructing section 28 is not essential.

In the illustrated case, the frame information constructing section 28 comprises a punch 56 for perforating the light-sensitive material A to provide holes representing frame information and/or sort information, guides 58a and 58b provided upstream and downstream, respectively, of the punch 56, a sensor 60 for detecting the advancing end of the light-sensitive material A, and a transport roller pair 62. The transport roller pair 62 transports frame by frame the light-sensitive material A and repeats this process intermittently in accordance with its amount in a second loop forming section 64 to be described just below. When the necessary transport ends, the punch 56 is activated to construct frame information and/or sort information.

In the illustrated case of photographic printer/processor 10, frame information and/or sort information is constructed by perforating the light-sensitive material A with the punch 56. Alternatively, frame information and/or sort information may be constructed by various other recording means such as thermal transfer using an ink ribbon or an ink jet process, thereby marking with lines, dots, etc. In this alternative case, the back printing section 32 which utilizes the back printer 82 of the invention to be described below may be provided in the position where the frame information constructing section 28 would otherwise be located, so that said back printing section 32 will serve to construct the necessary frame information and sort information.

Provided downstream of the frame information constructing section 28 is the exposing section 30 having the second loop forming section 64, an auxiliary scan transport system 66 and a third loop forming section 68.

In the illustrated apparatus, the exposing section 30 and the optical beam scanner 22 positioned to its left as seen in FIG. 2 combine to make up the exposing means such that the light beams L modulated by the optical beam scanner 22 in accordance with the image to be recorded (or the image data therefor) are deflected to perform scanning in a main scanning direction (perpendicular to the paper) while, at the same time, the light-sensitive material A as it is held in a specified exposing position is transported by the auxiliary scan transport system 66 to move in an auxiliary scanning direction (indicated by arrow b in FIG. 2) which crosses the main scanning direction at right angles, whereby the light-sensitive material A is exposed by two-dimensional scanning with the light beams L so as to record a latent image.

The optical beam scanner 22 is of a known type which comprises essentially sources of light beams for effecting R (red), G (green) and B (blue) exposure, modulating means such as AOMs (acoustic optical modulators), an optical deflector such as a polygonal mirror and an fθ lens.

The auxiliary scan transport system 66 in the exposing section 30 comprises the following components: an exposing drum 70 which transports the light-sensitive material A in the auxiliary scanning direction as it is held in the specified exposing position; two nip rollers 72 and 74 that are spaced apart in the auxiliary scanning direction, with the exposing position (scanning line) lying in between, and which are urged against the exposing drum 70 with the light-sensitive material A being interposed; a sensor 76 for sensing the frame information to thereby detect the image recording position; and a guide 77. The light-sensitive material A is transported in the auxiliary scanning direction by means of the exposing drum 70 in combination with the nip rollers 72 and 74.

When the light-sensitive material A is transported by the auxiliary scan transport system 66 until the frame information is detected with the sensor 76, the optical beam scanner 22 starts to operate. When the light-sensitive material A has been transported until the RECORD START position coincides with the exposing position, it starts to be exposed by scanning with the respective light beams L.

As already mentioned, the light beams L are deflected in the main scanning direction whereas the light-sensitive material A is transported in the auxiliary scanning direction which is perpendicular to the main scanning direction; as a result, the light-sensitive material A is subjeted to full-fracte exposure by two-dimensional scanning with the light beams L.

An error that occurs to the auxiliary scan transport during exposure is a direct cause of deterioration in image quality as exemplified by streaks in the image. Therefore, in order to obtain prints having high-quality images recorded thereon, the light-sensitive material A has to be transported very precisely by means of the auxiliary scan transport system 66. In addition, the construction of frame information, the recording of an image with the optical beam scanner 22 and the back printing to be described below differ from each other in terms of both timing and the transport speed of the light-sensitive material A and, what is more, the transport of the light-sensitive material A has to be stopped when the frame information is constructed by making holes with the punch 56.

Under these circumstances, the illustrated photographic printer/processor 10 has the second loop forming section 64 provided upstream of the auxiliary scan transport system 66, and a third loop forming section 68 downstream of the same auxiliary scan transport system 66, such that a loop of the light-sensitive material A is formed between the auxiliary scan transport system 66 and each of the upstream transport means (transport roller pair 62) and the downstream transport means (transport roller pair 78). The second and third loop forming sections will eliminate the adverse effects (e.g. back tension and stretching) which may be caused by the upstream and downstream transport means on the auxiliary scan transport by means of the auxiliary scan transport system 66, thus providing for highly precise auxiliary scan transport of the light-sensitive material A.

In the illustrated embodiment, the back printer 82 of the invention is utilized in the photographic printer/processor 10 which performs digital exposure by scanning with light beams. If desired, the back printer is also applicable with equal advantage to the conventional photographic printer which performs "direct" (analog) exposure, in which projection optics illuminates one frame of a film that has been transported by a carrier or the like to a specified position and the resulting projected light bearing the image recorded on the film (particularly on the frame of interest) is focused on a light-sensitive material A to thereby perform exposure.

The back printing section 32 is provided downstream of the exposing section 30. As already mentioned, the back side (non-exposed surface) of a finished print has a so-called "back print" recorded thereon and the back print comprises various kinds of information on the print, including frame number, film number, dates such as the date of shooting the photographic film and the date of printing the film image onto the light-sensitive material, photofinisher (lab) identification code and other data, consisting of characters, letters, marks, symbols and figures. The back printing section 32 is the site where such back print is recorded.

The back printing section 32 comprises a sensor 80, the back printer 82 of the invention, a transport roller pair 84 positioned upstream of the back printer 82 and a transport roller pair 86 which is positioned downstream of the back printer 82 such that the latter is positioned between the two transport roller pairs. The back printer 82 of the invention is a solid ink jet printer which performs the back printing of images (not only of characters or letters but also of marks, symbols or figures) with jets of a nonaqueous heat-fusible ink which is solid at ordinary temperatures.

As already mentioned in connection with the prior art, the conventional phctographic printer (processor) performs back printing with either a dot impact printer or an ink jet printer. However, the dot impact printer which performs contact recording involves a serious problem in that an improperly adjusted head pressure will cause high spots to form on the print surface; the ink jet printer also has a difficulty in that the back print will dissolve to fade or even disappear as a result of development by a wet process.

In contrast, the back printer 82 of the invention employs a solid ink jet process to perform noncontact printing, thereby recording a nonaqueous back print which will not dissolve upon development by a wet process.

Figure 3:
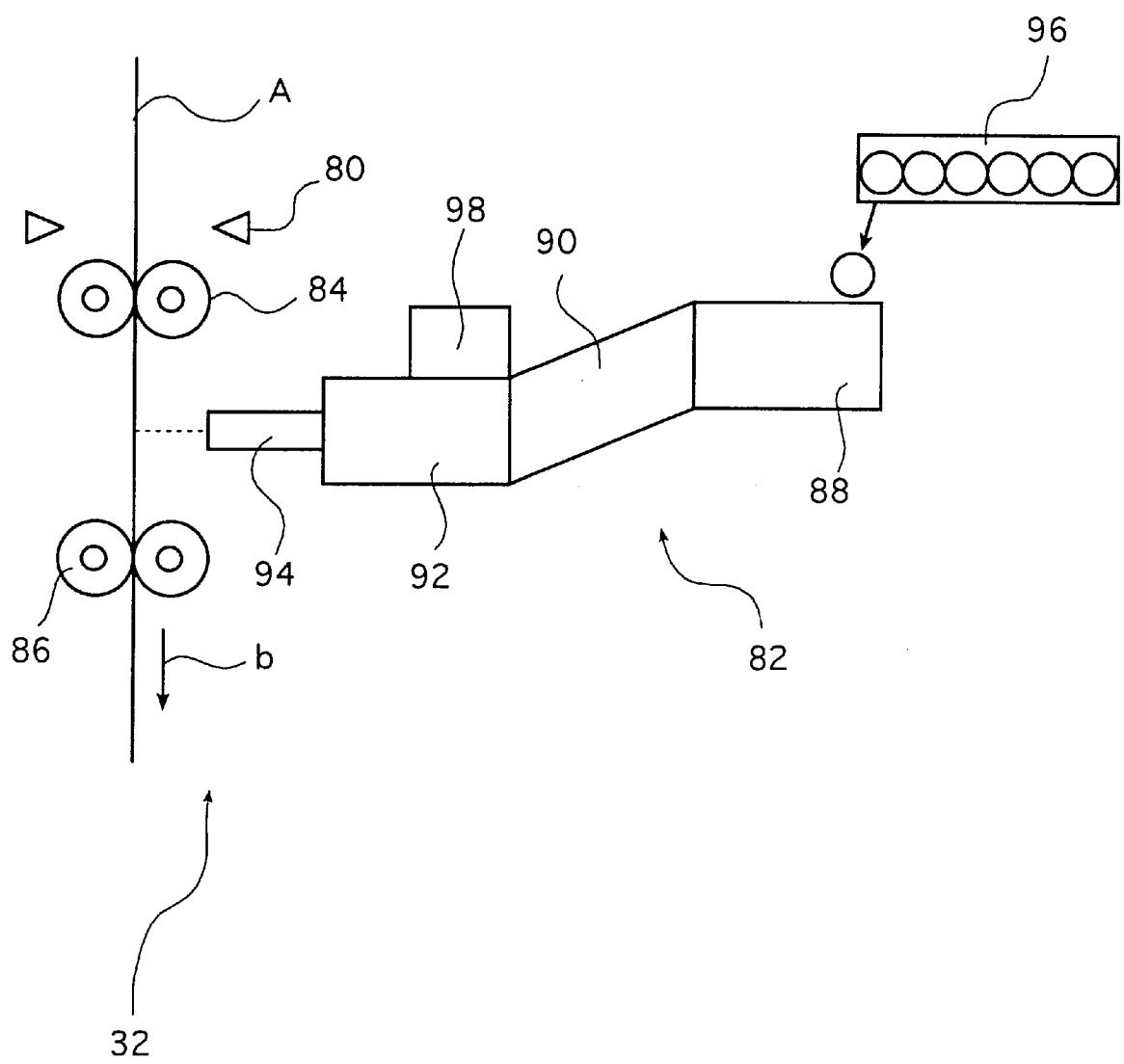
FIG. 3 shows schematically the back printing apparatus of the invention.

FIG. 3 is a schematic representation of the back printer 82 (in the back printing section 32). As shown, the back printer 82 essentially comprises an ink cassette 88, an ink leader 90, an ink loader 92 and a print head 94.

The ink cassette 88 is a site where an ink is to be charged. In the illustrated case, the ink is typically accommodated as a cylindrical solid form in an ink pack 96, from which a specified number of cylinders are charged into the ink cassette 88.

The ink to be used in the back printer 82 of the invention is a nonacieous heat-fusible ink which is solid at ordinary temperatures; being commonly named a solid ink, a phase changing ink or a hot melt ink, the ink is prepared by mixing at least one of waxes, at least one of aliphatic acid derivatives and at least one of necessary additives. Being nonaqueous, the ink will not dissolve in a developing solution or any other processing solutions used in the subsequent photographic processing in the developing unit 14; in addition, the ink is essentially solid and its performance is not affected by the composition or properties of the back side of the light-sensitive material A, thus allowing back prints to be recorded on the back side of a light-sensitive film. Examples of an ink that satisfies these requirements include those which are commonly used on color printers such as "JOLT" of Hitachi Koki Co., Ltd. and "Phaser 300i" of Tektronix, Inc.

The melting point of the ink is not limited to any particular value; preferably, it is a temperature at which it will not melt during the subsequent photographic processing including wet development and drying, namely, the preferred temperature should not be below a maximum temperature that is used in the photographic processing. More preferably, the melting point of the ink is at least 10° C. higher than the maximum temperature which is used in the photographic processing.

In addition, the ink is preferably designed and prepared in such a way as to realize the surface tension, wetting property, volume shrinkage factor and other parameters that permit satisfactory recording in accordance with the species of the light-sensitive material used, the recording density and other relevant factors.

The color of the ink commonly used in the back printing of photographs is black and black inks are also used with advantage on the back printer 82 of the invention. However, the use of black inks causes several difficulties, particularly when high-density back prints are recorded. First, when the printed image is read with an image reader such as a scanner, the back print is also read as image data. Second, and in an extreme situation, the back print on the back side of the finished print is seen through its viewing surface (a phenomenon generally referred to as "print-through"). Conversely, if the density of the back print is unduly low, it loses sharpness.

To avoid these difficulties, a gray ink is preferably used on the back printer 82 of the invention and it is capable of preventing print-through in an effective way and yet provides a sharp back print. If necessary, the ink may be so prepared as to be capable of recording chromatic back prints or multicolor back prints.

In the illustrated back printer 82, the ink meeting the above requirements may be formed as a solid cylinder and a plurality of such cylinders are accommodated in the ink pack 96, from which a specified number of the cylinders are loaded into the ink cassette 88.

The ink leader 90 picks up the necessary number of solid ink cylinders from the ink cassette 88 in accordance with the amount of the ink present in the ink loader 92 to be described just below and the picked up ink cylinders are transported for supply into the ink loader 92.

The ink loader 92 heats the supplied solid ink until it melts to a liquid state so that it can be fed into the print head 94 (or its pressurizing compartment). The viscosity of the liquefied ink is not limited to any particular value and may be set as appropriate for various factors such as the structure of the print head 94; a typical value is about 10 mPa·s.

The print head 94 has basically the same construction as the head of a common ink jet printer using liquid inks and it may be a known ink jet print head, which uses a piezoelectric device made of a material such as PZT to vibrate the ink within the pressurizing compartment in accordance with the image to be recorded, whereupon the ink is jetted or forced through the nozzles to form ink jets, which are electrified by passing between charging electrodes and deflected by deflecting electrodes to produce a back print on the back side of the light-sensitive material A. It should be noted that the print head 94 in the back printer 82 of the invention is preferably equipped with temperature control means (temperature controller) 98 for controlling the viscosity of the liquefied ink.

Another feature of the back printer 82 of the invention which employs the normally solid ink is that the ink jetted or forced through the nozzles has high viscosity and that the diameter of ink jet drops has only a small difference from the diameter of ink dots to be formed on the back side of the light-sensitive material A; therefore, the nozzles to be used on the back printer 82 have preferably a larger diameter than the ordinary ink jet nozzles and the difference depends on the desired density of pixels to be recorded on the back print.

The number of nozzles to be employed on the back printer 82 of the invention is not limited to any particular value and may be determined as appropriate depending on such factors as the pixel density of the back print and the size of the letters to be recorded; preferably, about 10–100 nozzles are employed.

As a further feature, the back printer 82 of the invention may be equipped with a plurality set of components including the ink cassettes 88, the ink leaders 90, the ink loaders 32 and the print heads 94 in accordance with the colors (e.g cyan, magenta, yellow, black) of the inks used for the multicolor back prints or with a plurality set of one or more components including at least the print head 94 in accordance with the color inks and one common set of remainer of the components.

The number of lines to be included in the back print to be recorded by the back printer 82 of the invention is not limited to any particular value and only one line may be back-printed or typed. However, to perform back printing with the aforementioned "advanced photo system" or to record a larger volume of information in a back print, it is preferred that two or more lines are back printed simultaneously; to meet this need, either the print head 94 or the back printer 82 per se is preferably adapted to be capable of recording more than one line.

Further, a head carriage may optionally be provided to permit recording with the back printer 82 (or the print head 94 alone)being moved in a direction perpendicular to the direction of transport (in the illustrated case, the direction of its movement is parallel to the main scanning direction).

The back printer 82 of the invention which has the structural features described above records back prints in a noncontact manner; hence, neither sensitization nor desensitization will occur in areas surrounding the back-printed portion and there will be no formation of high spots on the print surface which would otherwise occur if the light-sensitive material A were given impact on the back side. Another advantage that results from the performance of noncontact recording is that back printing can be done without adversely affecting the transport of the light-sensitive material A; in the case where cut sheets are scanned, transported and exposed, a photographic printer is practically feasible without including the above-described second loop forming section 64 and third loop forming section 68; even in this case, the back printer 82 of the invention allows imagewise exposure of high precision without causing adverse effects on the transport in the auxiliary scanning direction.

As a further advantage, the use of a nonaqueous solid ink enables sharp printing or typing without bleeding; in addition, there is a great latitude in the range of light-sensitive materials A that can be processed by the back printer 82 and it is possible to record back prints on photographic films without causing them to dissolve out during development by a wet process.

Thus, using the back printer 82 of the invention, one can produce back prints of high quality without causing any adverse effects on the light-sensitive material A and yet good handling properties are assured.

Therefore, the photographic printer/processor 10 (or a photographic printer) which uses the back printer 82 of the invention is capable of recording back prints of high quality and outputting finished prints of high quality in a consistent manner without any damage or other defects due to the back printing operation.

The light-sensitive material A is ejected from the aforementioned third loop forming section 68 by means of the transport roller pair 78 which, when the volume of the light-sensitive material A accumulating in the third loop forming section 68 exceeds a specified limit, may transport the light-sensitive material intermittently on a print-by-print basis until the next frame information is detected with the sensor 80. The transport roller pairs 84 and 86 transport the light-sensitive material A in synchronism with the transport by the transport roller pair 78.

The light-sensitive material A being transported makes temporary stop at the point of time when the frame information is detected with the sensor 80. In response to this stop, the back printer 82 senses the position of back print recording in the direction of transport of the light-sensitive material A (in the illustrated case, this direction is parallel to the auxiliary scanning direction b) and prints the intended back print in the specified position in synchronism with the transport of the light-sensitive material A by means of the transport roller pairs 84 and 86. Thus, the transport roller pairs 84 and 86 also serve as a platen for holding the light-sensitive material A in a specified position during back printing with the back printer 82.

A bending transport section 98 is provided downstream of the back printing section 32, and a sensor 100 and a first cutter 102 are provided downstream of the bending transport section 98. The first cutter 102 is not used in the ordinary operational state of the photographic printer/processor 10 but typically used for ejecting all of the exposed light-sensitive material A which has been accommodated in the reservoir (to be described just below) after the end of the exposing procedure.

The reservoir 34 is provided downstream of the first cutter 102. The exposed light-sensitive material A is placed in the reservoir 34 temporarily and as the development process proceeds or with the lapse of time after exposure, the light-sensitive material A is ejected from the reservoir 34 to be transported to the subsequent step.

The reservoir 34 absorbs the time difference between the development process and the exposure (usually, the development process takes more time than the exposure) to thereby enable efficient operation of the photographic printer/processor. In addition, the reservoir 34 is capable of preventing the fading of latent images which would otherwise occur if the exposure were immediately followed by the development process.

Provided downstream of the reservoir 34 is a bending transport section 1041 and the light-sensitive material A is transported from the reservoir 34 into the ejecting section 36 by this bending transport section 104.

The ejecting section 36 comprises a second cutter 106 and a fourth loop forming section 108 positioned downstream of the second cutter 106. The second cutter 106 is for cutting the light-sensitive material A in an emergency such as when a trouble has occurred. If a certain trouble occurs in the processor (developing unit 14) or the like, the second cutter 106 will cut the light-sensitive material A so that no adverse effects will be transmitted to the exposed light-sensitive material A already accommodated in the reservoir 34.

The fourth loop forming section 108 forms a loop in order to ensure that the light-sensitive material A will not be damaged even if it is pulled inadvertently in the developing unit 14; it comprises, in the direction of transport of the light-sensitive material A, a guide roller 110, transport means 112 and a sensor 114, and a loop is formed in accordance with both the speed of transport by the transport means 112, namely, the speed of processing in the developing unit 14, and the transport by the bending transport section 104.

In the illustrated photographic printer/processor 10, the light-sensitive material A leaving the ejecting section 36 is transported into the developing unit 14 which is a wet processor that performs developing and subsequent treatments in accordance with the type of the light-sensitive material A used. If the light-sensitive material A is a silver halide photographic material, the developing unit 14 typically comprises a color developing tank 116, a bleach-fixing tank 118, rinsing tanks 120a, 120b, 120c and 120d, as shown in FIG. 1. The exposed light-sensitive material A is sequentially submerged in the respective treating tanks so that it is subjected to specified treatments for development, whereby the latent image is rendered visible.

After the development, the light-sensitive material A is sent to the drying unit 16, where it is dried by any known method and thence transported to the ejecting unit 18.

The ejecting unit 18 comprises a cutting section 122 and a sorter 124. The cutting section 122 detects the frame information and accordingly cuts the light-sensitive material A to produce single finished prints. The sorter 124 is of the usual type having a plurality of racks which, in accordance with the result of detection of the sort information by the cutting section 122, rotates or slides to change racks for accommodating a specified number of finished prints as sorted in accordance with the sort information.

While the back printer of the invention has been described above in detail, it should of course be understood that the invention is by no means limited to the embodiment described above and various improvements and modifications may be made without departing from the scope and spirit of the invention.

The illustrated back printer is designed for incorporation into a so-called "mini-lab" system which is an integral assembly of a printing apparatus and a developing apparatus. The back printer is also applicable with advantage to a printing apparatus which is not combined with a developing apparatus but which accommodates a roll of exposed light-sensitive material in an undeveloped state.

As described above in detail, the back printer of the invention records back prints in a noncontact manner and, hence, using this back printer, one can produce sharp back prints of high quality without causing any adverse effects on the light-sensitive material A and yet good handling properties are assured.

Therefore, using the back printer of the invention, one can realize a photographic printer or printer/processor that are capable of recording back prints of high quality and outputting finished prints of high quality in a consistent manner without any damage or other defects due to the back printing operation.

What is claimed is:

1. A back printing apparatus for recording a back print on a non-exposed surface of a light-sensitive material to be subjected to wet photographic processing comprising:

a charging section to be charged with an ink which is heat-fusible but sold at ordinary temperatures and which is not water-soluble;

a melting section for melting said ink; and a print head from which the ink melted in said melting section is jetted to record the back print.

2. A back printing apparatus according to claim 1, wherein said ink is gray in color.

3. A back printing apparatus according to claim 1, wherein said ink is black in color.

4. A back printing apparatus according to claim 1, wherein said ink has a melting point higher than a maximal temperature which occurs during the wet photographic processing of said light-sensitive material.

5. A back printing apparatus according to claim 4, wherein said melting point of said ink is at least 10° C. higher than said maximal temperature.

6. A back printing apparatus according to claim 1, wherein said ink is designed and prepared in such a way as to realize its surface tension, wet property and volume shrinkage factor that permit satisfactory recording in accordance with species of the light-sensitive material and a recording density.

7. A back printing apparatus according to claim 1, wherein said ink is prepared by mixing at least one of waxes, at least one of aliphatic acid derivatives and at least one of necessary additives.

8. A back printing apparatus according to claim 1, wherein said printer head is equipped with temperature control means for controlling the temperature of the melted ink.

9. A back printing apparatus according to claim 1, wherein said printer head has 10 to 100 nozzles through which the melted ink is jetted.

* * * * *